US008335471B2

(12) United States Patent  
Alford et al.

(10) Patent No.: US 8,335,471 B2
(45) Date of Patent: Dec. 18, 2012

(54) SYSTEMS AND METHODS FOR CHANNEL PAIRING A TRANSMITTER AND A RECEIVER

(75) Inventors: Ronald Clayton Alford, Austin, TX (US); Noshir Dubash, Chandler, AZ (US); Douglas W. Schucker, Gilbert, AZ (US)

(73) Assignee: CSR Technology, Inc., Sunnyvale, CA (US)

( * ) Notice: Subject to any disclaimer, the term of this patent is extended or adjusted under 35 U.S.C. 154(b) by 805 days.

(21) Appl. No.: 12/332,590

(22) Filed: Dec. 11, 2008

(65) Prior Publication Data

US 2010/0151786 A1  Jun. 17, 2010

(51) Int. Cl.
*H04B 7/00* (2006.01)
*H04B 15/00* (2006.01)
*H04B 1/40* (2006.01)
*H04W 4/00* (2009.01)

(52) U.S. Cl. ......... 455/41.2; 455/62; 455/426.1; 455/77

(58) Field of Classification Search ............ 455/41.2, 455/426.1, 426.2, 452.2, 455, 456.2, 456.5, 455/24, 39, 522, 509, 516, 62, 77; 375/202, 375/219, 354, 356, 358, 364, 368
See application file for complete search history.

(56) References Cited

U.S. PATENT DOCUMENTS

| | | | | |
|---|---|---|---|---|
| 5,628,052 A * | 5/1997 | DeSantis et al. | ........... | 455/562.1 |
| 6,043,777 A * | 3/2000 | Bergman et al. | ......... | 342/357.55 |
| 6,141,357 A * | 10/2000 | Testani et al. | ................. | 370/507 |
| 6,167,260 A * | 12/2000 | Azam et al. | ................... | 455/434 |
| 6,449,269 B1 * | 9/2002 | Edholm | ........................ | 370/352 |
| 7,512,380 B2 * | 3/2009 | McGowan | .................... | 455/63.3 |
| 7,941,822 B2 * | 5/2011 | Hennenhoefer et al. | ........ | 725/82 |
| 2009/0311973 A1 * | 12/2009 | Zhang et al. | .................... | 455/77 |

OTHER PUBLICATIONS

Silicon Laboratories; Si4720/21—Broadcast FM Radio Transceiver for Portable Applications; 2 pages.

* cited by examiner

*Primary Examiner* — Andrew Wendell
*Assistant Examiner* — Chung-Tien Yang
(74) *Attorney, Agent, or Firm* — Next IP Law Group LLP; Minh N. Nguyen, Esq.

(57) ABSTRACT

Systems and methods for channel pairing a transmitter and a receiver are provided. In this regard, a representative method, among others, includes selecting a channel in a radio frequency (RF) band; transmitting a carrier and alert tone on the selected channel in the RF band; responsive to detecting the transmitted carrier and alert tone, demodulating the carrier and alert tone on the selected channel in the RF band and producing the demodulated alert tone; and responsive to detecting the produced alert tone, using the selected channel to establish a wireless link between the transmitter and receiver.

24 Claims, 6 Drawing Sheets

SYSTEMS AND METHODS FOR CHANNEL PAIRING A TRANSMITTER AND A RECEIVER

TECHNICAL FIELD

The present disclosure is generally related to transmitting and receiving devices and, more particularly, is related to systems and methods for channel pairing a transmitter and a receiver.

BACKGROUND

Multiple vendors presently offer compact FM transceivers that scan the commercial broadcast band and suggest unoccupied channels to use when channel pairing the compact transceiver to a local receiver. These approaches typically involve manually matching the transmitter and receiver channels. Manually matching the transmitter to the receiver channel can be a nuisance as well as a distraction to users, particularly when driving.

SUMMARY

Systems and methods for channel pairing a transmitter and a receiver are provided. In this regard, a representative system, among others, includes a transmitter and receiver. The transmitter selects a channel in a radio frequency (RF) band and transmits a carrier and alert tone on the selected channel in the RF band. The receiver receives and demodulates the carrier and alert tone. The receiver includes a speaker that produces the demodulated alert tone. The transmitter includes a microphone that is configured to detect the produced alert tone. Responsive to detecting the produced alert tone, the transmitter is configured to use the selected channel to establish a wireless link between the transmitter and receiver.

In this regard, a representative method, among others, includes selecting a channel in a radio frequency (RF) band; transmitting a carrier and alert tone on the selected channel in the RF band; responsive to detecting the transmitted carrier and alert tone, demodulating the carrier and alert tone on the selected channel in the RF band and producing the demodulated alert tone; and responsive to detecting the produced alert tone, using the selected channel to establish a wireless link between the transmitter and receiver.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the process for channel pairing a transmitter and a receiver.

Presently available short-range transmitters have to be manually tuned in order for their transmit channel to match the channel being received by a nearby receiver. The transmitter described in this disclosure could automatically move to the same channel as that which has been manually selected by the user of the nearby receiver. This would enable the compact short-range transmitter to take advantage of the audio output system of the receiver and may eliminate the need for a redundant and potentially lower performance audio output system on the compact transmitter itself.

In one possible use-case, if a car driver is listening to a recorded audio program via the wireless link between a short-range transmitter and the car's receiver and a new geographical region is entered in which the presently tuned receiver channel is occupied by a higher power commercial broadcast station, the transmitter described in this disclosure can automatically move to the unoccupied channel manually selected by the driver on the car's receiver. The driver does not take the extra step to manually match the transmitter channel to the car's receiver channel, facilitating to minimize driver distraction, as well as increase convenience. This use case would also apply to an on-going phone-call being transmitted to the car stereo from a transmitter integrated in the cell phone.

As another use-case example, if a car driver is listening to a commercial radio broadcast and using a global positioning system (GPS), turn-by-turn direction prompts from a global positioning system (GPS) or a personal navigation device (PND) device can be heard over the car's audio system regardless of which channel the driver is listening to at the time. If a car driver changes the receiver channel, the transmitter described in this disclosure can remain paired with the tuned receiver channel such that turn-by-turn directions continue to be heard by the driver on the presently selected channel. This use case would also apply to audio from an incoming phone call transmitted to the car stereo from a transmitter integrated in the cell phone.

Figure 1:
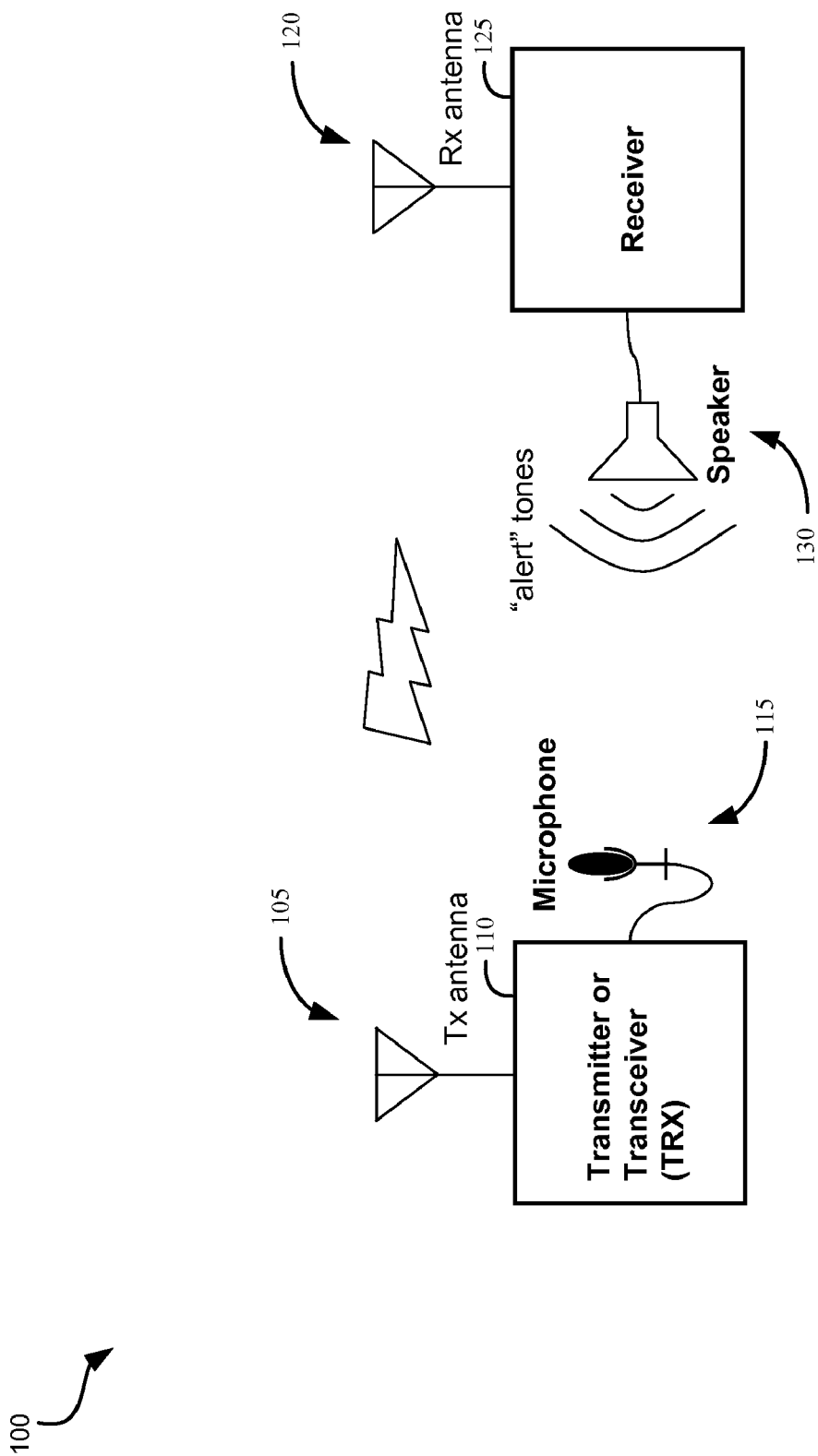
FIG. 1 is an overview of a system that channel pairs a transmitter and receiver.

FIG. 1 is an overview of a system 100 that channel pairs a transmitter 110 and receiver 125. It should be noted that the transmitter 110 can be a transceiver as illustrated in FIG. 1. The transmitter 110 selects a channel in a radio frequency (RF) band and transmits a carrier and alert tone on the selected channel in the RF band using an antenna 105. The receiver 125 receives the carrier and alert tone using antenna 120 and demodulates the carrier and alert tone. The receiver includes a speaker 130 that produces the demodulated alert tone.

The transmitter 110 includes an audio microphone 115 that is configured to detect the produced alert tone. Responsive to detecting the produced alert tone, the transmitter 110 is configured to use the selected channel to establish a wireless link between the transmitter 110 and receiver 125. Detection of the alert tones can be done by a variety of means at the transmitter 110. The audio picked up by the microphone 115 can be sent to a correlator (not shown) that matches the audio signal against the original alert tone being modulated and transmitted. A fast Fourier transform (FFT) module (not shown) could also be used to check for the presence of the alert tone or tones.

It should be noted that the transmitter 110 may be a standalone transmitter or a transmitter integrated into another portable device such as a cell phone, personal navigation device (PND), personal digital assistant (PDA) or MP3 player. In some cases, such as in a cell phone, the portable device may already have in integrated microphone built into it, in which case the transmitter 110 would have the capability to enable the existing microphone and to access its output. The process of channel pairing the transmitter 110 and receiver 125 is further described in relation to FIGS. 2-6.

Figure 2:
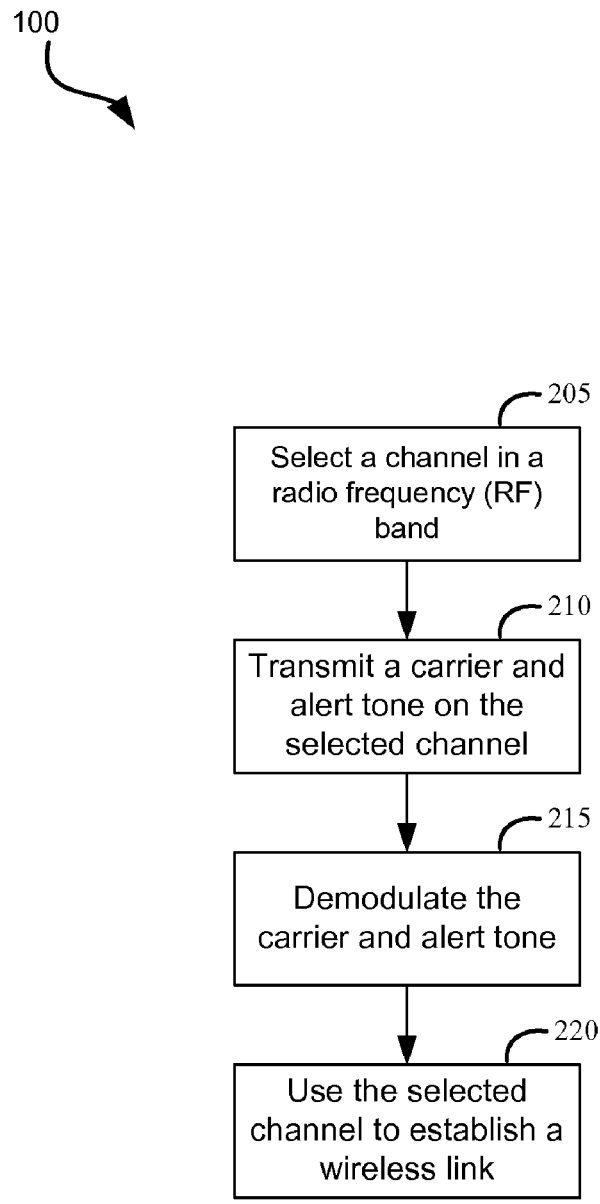
FIG. 2 is a high-level flow diagram that illustrates an embodiment of the architecture, functionality, and/or operation of the system 100, such as that shown in FIG. 1, having functionality of transmitter and receiver pairing sequence.

FIG. 2 is a high-level flow diagram that illustrates an embodiment of the architecture, functionality, and/or operation of the system 100, such as that shown in FIG. 1, having the functionality of a transmitter and receiver pairing sequence. In steps 205 and 210, the transmitter 125 (FIG. 2) selects a channel in a radio frequency (RF) band and transmits a carrier and alert tone on the selected channel in the RF band. Responsive to the receiver 125 (FIG. 1) detecting the carrier and alert tone on the selected channel, the receiver 125, in step 215, demodulates the carrier and alert tone on the selected channel in the RF band and produces the demodulated alert tone. Responsive to the transmitter 110 detecting the produced alert tone, the transmitter 110 uses the selected channel to establish a wireless link between the transmitter 110 and receiver 125.

Figure 3:
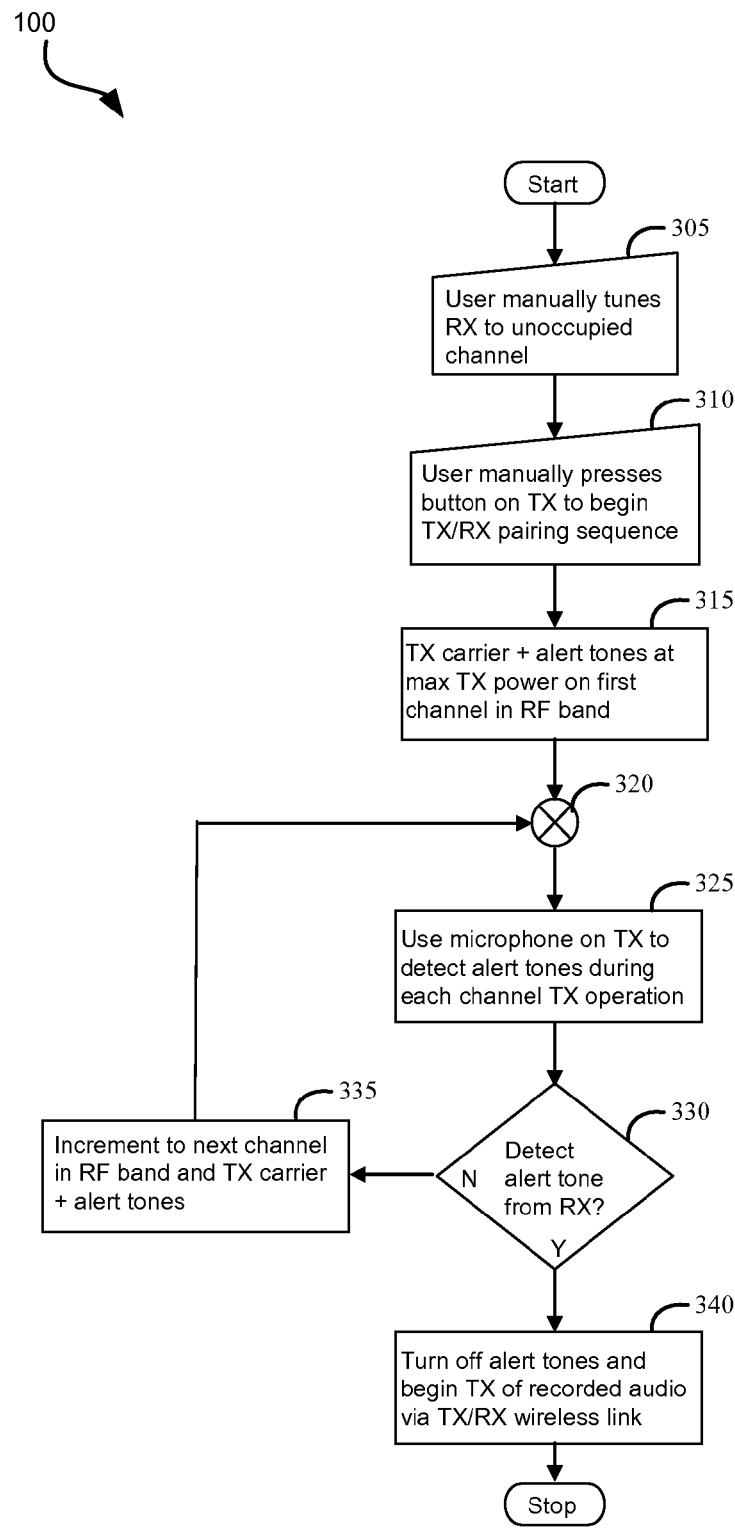
FIG. 3 is a flow diagram that illustrates another embodiment of the architecture, functionality, and/or operation of the system, such as that shown in FIG. 1, having the functionality of a transmitter and receiver pairing sequence.

FIG. 3 is a flow diagram that illustrates another embodiment of the architecture, functionality, and/or operation of the system, such as that shown in FIG. 1, having the functionality of a transmitter and receiver pairing sequence. In steps 305 and 310, a user manually tunes a receiver 125 (FIG. 1) to an unoccupied channel and manually presses a button on a transmitter 110 (FIG. 1) to begin the transmitter to receiver pairing sequence. In step 315, the transmitter 110 transmits a carrier and alert tone at a maximum transmission power on a first channel in the RF band. In step 320, the receiver 125 receives and demodulates the transmitter carrier and alert tone on the first channel. The receiver 125 further produces the demodulated alert tone.

In step 325, the transmitter 110 uses the microphone 115 (FIG. 1) to detect the produced alert tone. In step 330, the transmitter 110 determines whether the microphone 115 detects the produced alert tone from the receiver 125. Responsive to the transmitter 110 not detecting the alert tone, the transmitter 110 increments to the next channel in the RF band and transmits the carrier and alert tone on the next incremented channel. The sequence is repeated at step 320 using the next incremented channel until the alert tone is detected. Responsive to the transmitter 110 detecting the alert tone, the transmitter 110 establishes a wireless link between the transmitter 110 and receiver 125 using the channel that the alert tone was on and detected. At step 340, the transmitter 110 turns off the alert tone and begins transmission of, e.g., recorded audio, via the transmitter and receiver wireless link.

Alternatively or additionally, the transmitter 110 could transmit simultaneously on multiple channels with respective unique alert tones. The transmitter 110 can determine whether one of the unique alert tones is detected. Responsive to detecting one of the unique alert tones on one of the respective multiple channels, the transmitter 110 uses the one channel of the multiple channels associated with the detected unique alert tone to establish the wireless link between the transmitter 110 and receiver 125.

Figure 4:
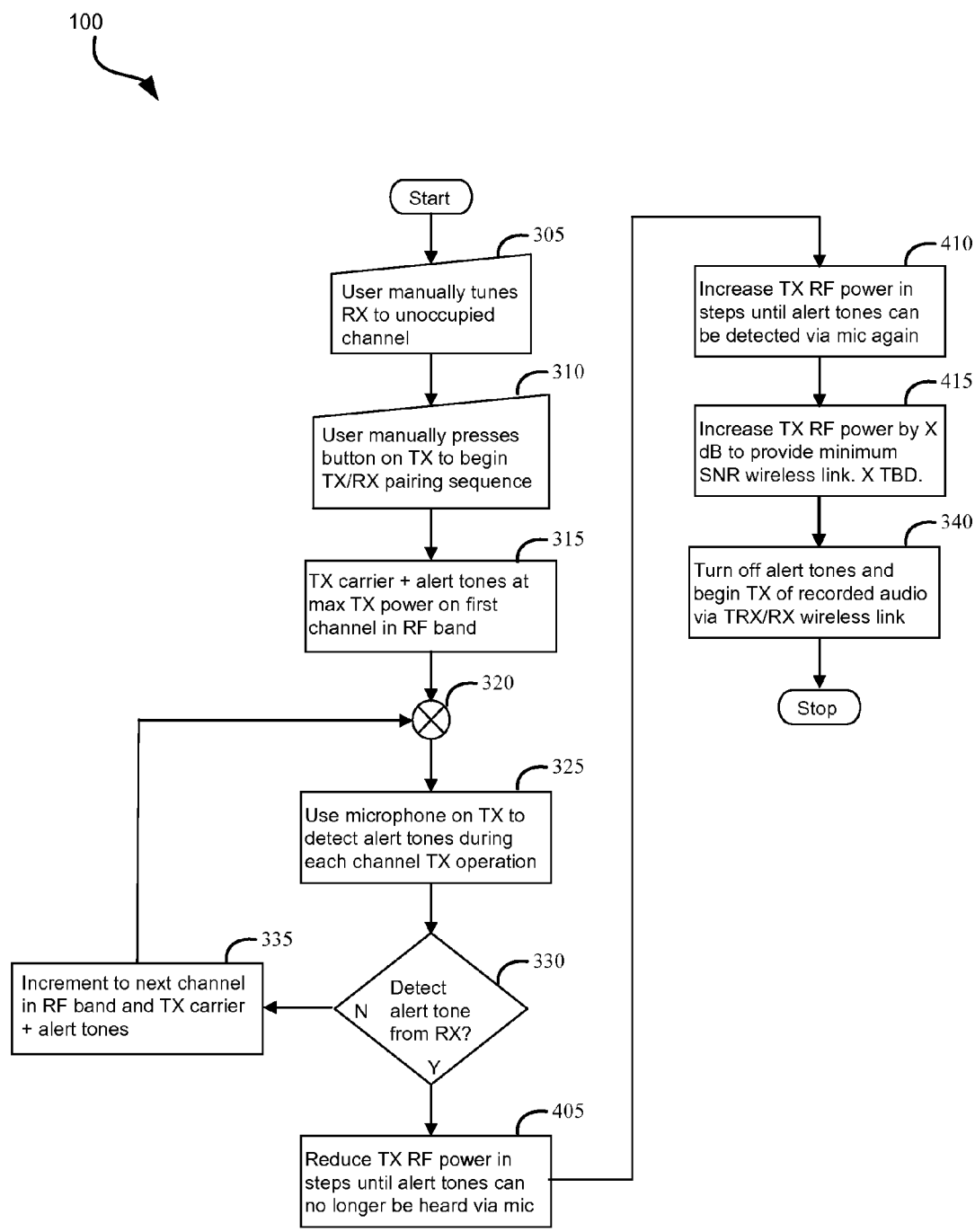
FIG. 4 is a flow diagram that illustrates yet another embodiment of the architecture, functionality, and/or operation of the system, such as that shown in FIG. 1, having the functionality of a transmitter and receiver pairing sequence using minimum radio frequency (RF) transmission power.

FIG. 4 is a flow diagram that illustrates an embodiment of the architecture, functionality, and/or operation of the system, such as that shown in FIG. 1, having the functionality of a transmitter and receiver sequence using minimum radio frequency (RF) transmission power. The functionality and operation of the system in FIG. 4 is similar to the functionality and operation of the system in FIG. 3 and so the system in FIG. 4 includes steps 305, 310, 315, 320, 325, 330, 335, and 340.

The functionality and operation of the system in FIG. 4 further include step 405 where the transmitter 110 can incrementally reduce the RF transmission power of the channel associated with the detected alert tone until the alert tone is no longer detected by the transmitter 110. In step 410, the transmitter 110 can incrementally increase the RF transmission power of the channel associated with the detected alert tone by a predetermined amount to provide a minimum acceptable signal-to-noise ratio wireless link. The functionality and operation of the system in FIG. 4 can allow for a reduction in the RF transmission power level while a user can listen to the recorded audio on an empty channel.

Figure 5:
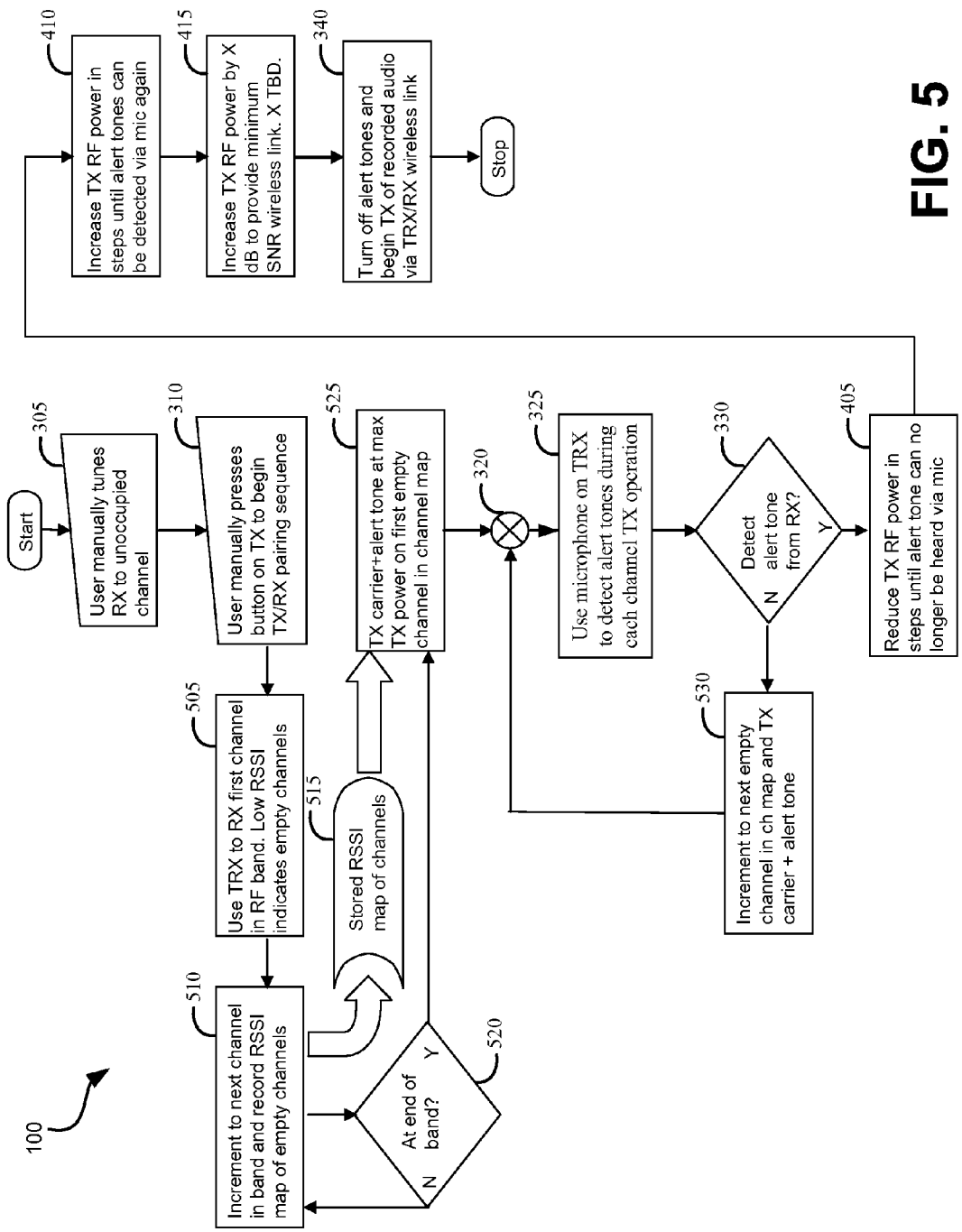
FIG. 5 is a flow diagram that illustrates yet another embodiment of the architecture, functionality, and/or operation of the system, such as that shown in FIG. 1, having the functionality of a transceiver and receiver pairing sequence using a low RSSI channel.

FIG. 5 is a flow diagram that illustrates an embodiment of the architecture, functionality, and/or operation of the system 100, such as that shown in FIG. 1, having the functionality of a transceiver and receiver pairing sequence using a low RSSI channel. The functionality and operation of the system in FIG. 5 is similar to the functionality and operation of the system in FIG. 4 and so the system in FIG. 5 includes steps 305, 310, 320, 325, 330, 340, 405, 410, and 415.

The functionality and operation of the system in FIG. 5 further include step 505 where the transceiver 110 can be configured to receive the first channel in the RF band and configured to indicate that low received signal strength indication (RSSI) of the received channels are empty or unoccupied channels. In step 510, the transceiver 110 can sequentially select channels in the RF band and determine whether each of the selected channels has low received signal strength indication (RSSI). In step 515, the transceiver 110 records the low RSSI channels in an RSSI map of empty or unoccupied channels. In step 520, the transceiver 110 determines whether the selected channel is at the end of the RF band. The transceiver 110, in step 520, repeats step 510 until the transceiver 110 determines whether the selected channel is at the end of the RF band.

If the selected channel is at the end of the RF band, the transceiver 110, at step 525, selects one of the low RSSI channels in the RSSI map of empty or unoccupied channels and transmits the selected low RSSI channel for channel pairing the transceiver 110 and receiver 125. Alternatively or additionally, the alert tones could be spread across the bandwidth of the selected low RSSI channel such that the user does not hear the tones. Alternatively or additionally, the alert tones could be either high or low enough in frequency to be inaudible to the user, while still detectable to microphone 115 of the transceiver 110.

Alternatively or additionally, the transceiver 110, in step 505, can be configured to receive the first channel in the RF band and record the received signal strength indication (RSSI) of the received channel. In step 510, the transceiver 110 can sequentially select all channels in the RF band and determine an RSSI level of each of the selected channels. The transceiver 110, in step 520, repeats step 510 until the transceiver 110 determines whether the selected channel is at the end of the RF band. In step 515, the transceiver 110 records the RSSI level of each of the selected channels in a channel map. In step 525, the transceiver 110 determines a transmission power level that is a predetermined amount above the recorded RSSI level of each of the selected channels in the channel map and transmits the carrier and alert tone on any of the selected channels at the respective determined transmission power level.

One advantage, among others, is to allow the transceiver 110 and receiver 125 to synchronize regardless of whether the selected channel is occupied or empty because the determined transmission power level is high enough to over-ride any commercial broadcast station signal being monitored on the received channel at the time. For example, for a use-case in which turn-by-turn directions or unanticipated audio is to be heard over the commercial broadcast audio being received at the time, the channel map amplitude levels recorded by the transceiver 110 allows the transceiver 110 to transmit a large enough signal to block reception of the commercial broadcast signal and allows the alert tones to be detected and the unanticipated audio to be heard by the user via receiver 125.

The alert tone detection loop includes similar steps as in FIG. 4, such as, steps 320, 325, and 330. However, the alert tone detection loop in FIG. 5 further includes step 530 where the transceiver 110 increments to the next empty channel in the RSSI map of empty or unoccupied channels and transmits the carrier and alert tone on the incremented empty channel. The functionality and operation of the system in FIG. 5 can allow for a reduction in the transmission power consumption while pairing the transceiver and receiver, limiting the transceiver's operations during channel pairing by checking the empty channels stored in the RSSI map of empty or unoccupied channels instead of checking all available channels in the RF band.

Figure 6:
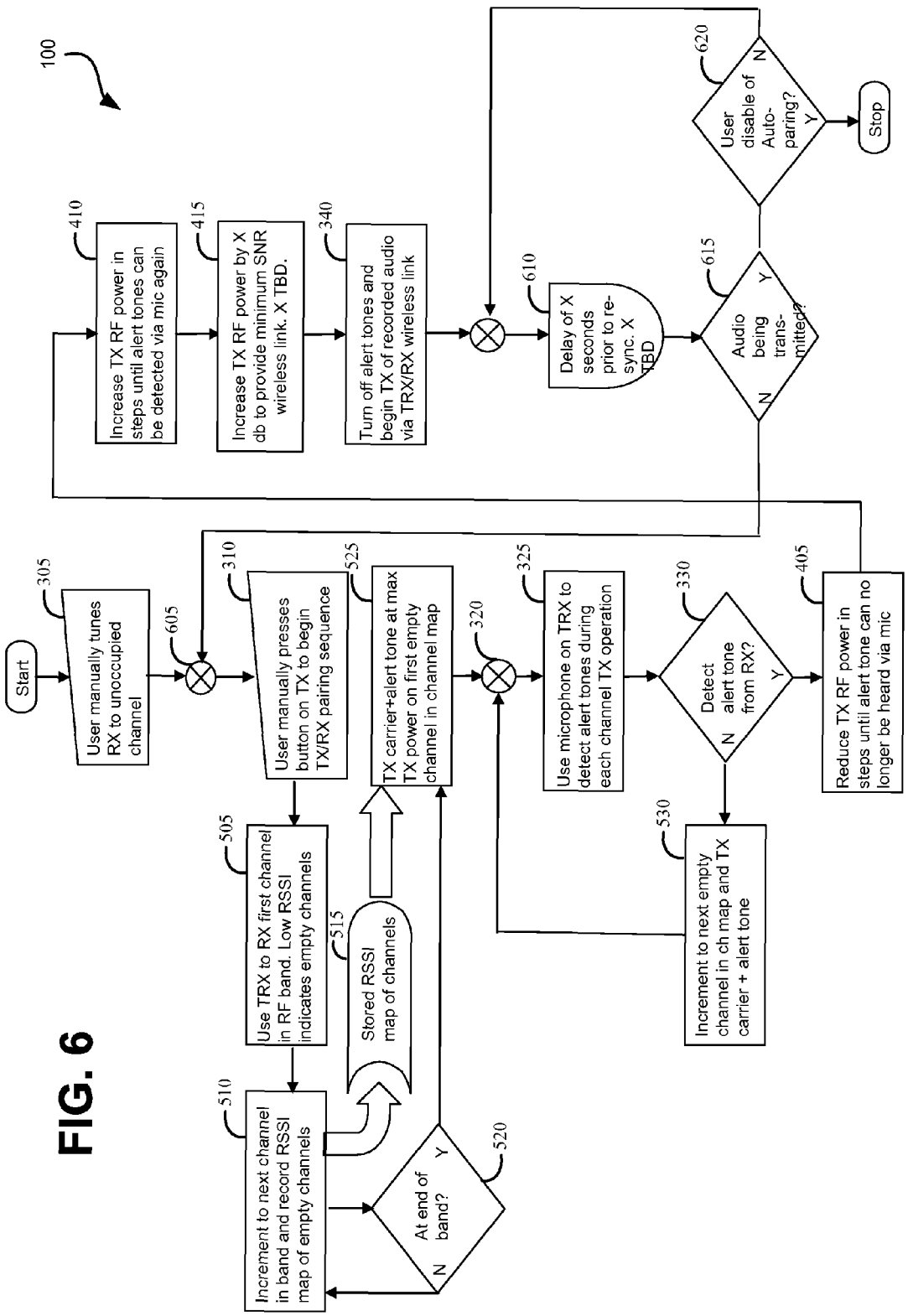
FIG. 6 is a flow diagram that illustrates yet another embodiment of the architecture, functionality, and/or operation of the system, such as that shown in FIG. 1, having the functionality of a transceiver and receiver pairing sequence with periodic autonomous re-sync.

FIG. 6 is a flow diagram that illustrates an embodiment of the architecture, functionality, and/or operation of the system 100, such as that shown in FIG. 1, having the functionality of a transceiver and receiver pairing sequence with periodic autonomous re-sync. The functionality and operation of the system in FIG. 6 is similar to the functionality and operation of the system in FIG. 5 and so the system in FIG. 6 includes steps 305, 310, 320, 325, 330, 340, 405, 410, 415, 505, 510, 515, 520, 525, and 530.

The functionality and operation of the system in FIG. 6 include the transceiver 110 that can periodically determine whether audio is being transmitted and allow a re-sync when audio is not being transmitted. After the transceiver 110, in step 610, delays for a pre-determined time, the transceiver 110, in step 615, determines whether the audio is being transmitted. Responsive to determining that audio is being transmitted, the transceiver 110, in step 620, determines whether the user has disabled the periodic autonomous re-sync feature.

If the user has disabled the re-sync feature, the transceiver 110 stops the re-sync operation. If the user did not disable the re-sync feature, the sequence repeats at step 610. Responsive to determining that audio is not being transmitted, the channel pairing sequence repeats at step 605 where the following steps starting at 605 enable the transceiver 110 to select one of the low RSSI channel in the RSSI map of empty channels and use the selected low RSSI channel for channel pairing the transceiver 110 and receiver 125. The functionality and operation of the system in FIG. 6 can allow the transceiver and receiver re-sync to periodically occur without user intervention to track the user's manual receiver channel changes.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A method for channel pairing a transmitter and a receiver, comprising:
   selecting a channel in a radio frequency (RF) band;
   transmitting a carrier and alert tone on the selected channel in the RF band by the transmitter;
   responsive to detecting the transmitted carrier and alert tone by the receiver, demodulating the carrier and alert tone on the selected channel in the RF band, and producing the demodulated alert tone by a speaker that is electrically coupled to the receiver; and
   responsive to detecting the produced alert tone by a microphone that is electrically coupled to the transmitter, using the selected channel by the transmitter to establish a wireless link between the transmitter and receiver.

2. The method as defined in claim 1, further comprising:
   responsive to not detecting the produced alert tone on the selected channel, selecting other channels in the RF band and repeating in claim 1 the steps of transmitting, demodulating, producing, and using the selected other channels until the alert tone is detected.

3. The method as defined in claim 2, wherein the step of selecting the other channels in the RF band is achieved by sequentially selecting others channels until the alert tone is detected.

4. The method as defined in claim 1, further comprising:
   simultaneously transmitting on multiple channels with respective unique alert tones;

determining whether one of the unique alert tones is detected; and responsive to detecting one of the unique alert tones on one of the respective multiple channels, using the one channel of the multiple channels associated with the detected unique alert tone to establish the wireless link between the transmitter and receiver.

5. The method as defined in claim 1, further comprising:
transmitting the selected channel at the maximum RF power allowed, and, once pairing has been achieved, reducing the maximum RF power of the selected channel by performing at least one of the following:
reducing the RF power of the selected channel until the alert tone is no longer detected; and
increasing the RF power of the selected channel by a predetermined amount to provide a minimum acceptable signal-to-noise ratio wireless link.

6. The method as defined in claim 1, further comprising:
sequentially selecting channels in the RF band;
determining whether each of the selected channels has low received signal strength indication (RSSI); and
responsive to determining that any of the selected channels have low RSSI, recording the low RSSI channels in an RSSI map of empty channels, wherein the transmitter is a transceiver.

7. The method as defined in claim 6, further comprising selecting one of the low RSSI channels in the RSSI map of empty or unoccupied channels and using the selected low RSSI channel for channel pairing the transceiver and receiver.

8. The method as defined in claim 6, further comprising:
transmitting audio using the selected channel;
periodically determining whether audio is being transmitted; and
responsive to determining that audio is not being transmitted, selecting one of the low RSSI channel in the RSSI map of empty channels and using the selected low RSSI channel for channel pairing the transceiver and receiver.

9. The method as defined in claim 1, further comprising:
sequentially selecting channels in the RF band;
determining an RSSI level of each of the selected channels; and
recording the RSSI level of each of the selected channels in a channel map, wherein the transmitter is a transceiver.

10. The method as defined in claim 9, further comprising:
determining a transmission power level that is a predetermined amount above the recorded RSSI level of each of the selected channels in the channel map; and
transmitting the carrier and alert tone on any of the selected channels at the respective determined transmission power level.

11. A method for channel pairing a transmitter and a receiver, comprising:
selecting a channel in a radio frequency (RF) band;
producing a carrier and alert tone on the selected channel in the RF band by a speaker;
responsive to detecting the transmitted carrier and alert tone by a microphone, demodulating the carrier and alert tone on the selected channel in the RF band, and producing the demodulated alert tone; and responsive to detecting the produced alert tone, using the selected channel to establish a wireless link between the transmitter and receiver; and
transmitting the alert tone that is inaudible to a user by performing at least one of the following:
spreading the alert tone across the selected channel bandwidth, resulting in the alert tone to be inaudible to the user; and
modulating the alert tone to be either high or low in frequency to be inaudible to the user.

12. A system for channel pairing a transmitter and a receiver comprising:
a transmitter that selects a channel in a radio frequency (RF) band and transmits a carrier and alert tone on the selected channel in the RF band; and
a receiver that receives and demodulates the carrier and alert tone, the receiver having a speaker that produces the demodulated alert tone, the transmitter having a microphone that is configured to detect the produced alert tone, responsive to detecting the produced alert tone, the transmitter being configured to use the selected channel to establish a wireless link between the transmitter and receiver.

13. The system as defined in claim 12, wherein responsive to not detecting the produced alert tone on the selected channel, the transmitter selects other channels in the RF band and transmits the carrier and the alert tone on the selected other channels, the receiver being configured to receive and demodulate the carrier and alert tone on the selected other channels, the speaker associated with the receiver being configured to produce the demodulated alert tone on the selected other channels, the microphone associated with the transmitter being configured to detect the produced alert tone, responsive to detecting the produced alert tone on the selected other channels, the transmitter being configured to use the selected other channels to establish a wireless link between the transmitter and receiver.

14. The system as defined in claim 13, wherein the transmitter selects other channels by sequentially selecting other channels until the alert tone is detected.

15. The system as defined in claim 12, wherein the transmitter performs the following:
simultaneously transmit on multiple channels with respective unique alert tones;
determine whether one of the unique alert tones is detected; and
responsive to detecting the one of the unique alert tones on the one of the respective multiple channels, use the one channel of the multiple channels associated with the detected unique alert tone to establish a wireless link between the transmitter and receiver.

16. The system as defined in claim 15, wherein the transmitter determines whether one of the unique alert tones is detected by simultaneously searching for a detected unique alert tone on each channel.

17. The system as defined in claim 12, wherein the transmitter transmits the selected channel at the maximum RF power allowed and reduces the maximum RF power of the selected channel by performing at least one of the following:
reduce the RF power of the selected channel until the alert tone is no longer detected; and
increase the RF power of the selected channel by a predetermined amount to provide a minimum acceptable signal-to-noise ratio wireless link.

18. The system as defined in claim 12, wherein the transmitter is a transceiver, which performs at least one of the following:
sequentially select channels in the RF band; determine whether each of the selected channels has low RSSI; and
responsive to determining that any of the selected channels have low RSSI, record the low RSSI channels in an RSSI map of empty channels.

19. The system as defined in claim 18, wherein the transceiver selects one of the low RSSI channels in the RSSI map of empty channels and uses the selected low RSSI channel for channel pairing the transceiver and the receiver.

20. The system as defined in claim 18, wherein the transceiver further performs the at least one of the following:
   transmit audio using the selected channel; periodically determine whether audio is being transmitted; and
   responsive to determining that audio is not being transmitted, select one of the low RSSI channels in the RSSI map of empty channels and use the selected low RSSI channel for channel pairing the transceiver and receiver.

21. The system as defined in claim 12, wherein the transmitter is a transceiver, which performs at least one of the following:
   sequentially select channels in the RF band; determine a RSSI level of each of the selected channels; and
   record the RSSI level of each of the selected channels in a channel map.

22. The system as defined in claim 21, wherein the transceiver determines a transmission power level that is a predetermined amount above the recorded RSSI level of each of the selected channels in the channel map and transmits the carrier and alert tone on any of the selected channels at the respective determined transmission power level.

23. A system for channel pairing a transmitter and a receiver comprising:
   a transmitter that selects a channel in a radio frequency (RF) band and transmits a carrier and alert tone on the selected channel in the RF band; and
   a receiver that receives and demodulates the carrier and alert tone, the receiver having a speaker that produces the demodulated alert tone, the transmitter having a microphone that is configured to detect the produced alert tone, responsive to detecting the produced alert tone, the transmitter being configured to use the selected channel to establish a wireless link between the transmitter and receiver,
   wherein the transmitter transmits the alert tone that is inaudible to a user by performing at least one of the following: spread the alert tone across the selected channel bandwidth, resulting in the alert tone to be inaudible to the user; and modulate the alert tone to be either high or low in frequency to be inaudible to the user.

24. A system for channel pairing a transmitter and a receiver comprising:
   a transmitter that selects a channel in a radio frequency (RF) band and transmits on the selected channel; and
   a receiver that receives and demodulates the carrier and alert tone, the receiver having a speaker that produces the demodulated alert tone, the transmitter having a microphone that is configured to detect the produced alert tone on the selected channel, responsive to detecting the produced alert tone on the selected channel, the transmitter uses the selected channel to establish a wireless link between the transmitter and receiver, responsive to not detecting the produced alert tone, the transmitter being configured to sequentially select other channels whereby the transmitter and receiver being configured to repeat the above mentioned functionalities until the alert tone is detected and a wireless link is established between transmitter and receiver.

* * * * *